US009811484B1

(12) United States Patent
O'Connell (10) Patent No.: US 9,811,484 B1
(45) Date of Patent: Nov. 7, 2017

(54) METHODS AND APPARATUS FOR RAPID INTERRUPT LOOKUPS

(71) Applicant: ALTERA CORPORATION, San Jose, CA (US)

(72) Inventor: Shane O'Connell, Labrador (CA)

(73) Assignee: Altera Corporation, San Jose, CA (US)

( * ) Notice: Subject to any disclaimer, the term of this patent is extended or adjusted under 35 U.S.C. 154(b) by 776 days.

(21) Appl. No.: 14/319,127

(22) Filed: Jun. 30, 2014

(51) Int. Cl.
*G06F 13/24* (2006.01)
*G06F 13/26* (2006.01)
*G06F 13/32* (2006.01)
*G06F 13/28* (2006.01)

(52) U.S. Cl.
CPC ............ *G06F 13/24* (2013.01); *G06F 13/287* (2013.01)

(58) Field of Classification Search
CPC ............. H04L 2209/125; H04L 49/901; H04L 49/9047; H04L 49/103
USPC ......................................... 710/260, 264, 269
See application file for complete search history.

(56) References Cited

U.S. PATENT DOCUMENTS

| | | | | | |
|---|---|---|---|---|---|
| 5,319,753 | A | * | 6/1994 | MacKenna | G06F 13/24 710/48 |
| 5,396,632 | A | * | 3/1995 | Gillet | G06F 9/4438 710/260 |
| 5,450,560 | A | * | 9/1995 | Bridges | G06F 5/10 708/211 |
| 5,603,014 | A | * | 2/1997 | Woodring | G06F 9/45504 703/22 |
| 5,640,563 | A | * | 6/1997 | Carmon | G06F 9/4887 718/102 |
| 5,734,911 | A | * | 3/1998 | Lai | 710/260 |
| 5,822,313 | A | | 10/1998 | Malek et al. | |
| 6,665,746 | B1 | * | 12/2003 | Liong | G06F 13/28 710/22 |
| 7,336,643 | B2 | | 2/2008 | Hiraoka et al. | |
| 2001/0007565 | A1 | * | 7/2001 | Weng | H04L 49/90 370/429 |
| 2002/0161941 | A1 | * | 10/2002 | Chue | G06F 13/4027 710/22 |
| 2003/0061597 | A1 | * | 3/2003 | Curtis | G06F 11/076 717/128 |
| 2006/0020731 | A1 | * | 1/2006 | Sasage | G06F 13/26 710/264 |

* cited by examiner

*Primary Examiner* — Faisal M Zaman
(74) *Attorney, Agent, or Firm* — Okamoto & Benedicto LLP (57) ABSTRACT

The present disclosure provides methods and apparatus for rapid interrupt look-ups for interrupts stored in memory. One embodiment relates to a method for providing interrupt lookups for a plurality of interrupt status vectors stored in random access memory on an integrated circuit. The plurality of interrupt status vectors in the random access memory are scanned to find activated interrupt status vectors that changed from null to non-null and dismissed interrupt status vectors that changed from non-null to null. A linked search list is maintained in the random access memory by inserting memory addresses of the activated interrupt status vectors into the linked search list and removing memory addresses of the dismissed interrupt status vectors from the linked search list. Interrupt status vectors for currently active interrupts are looked-up by transversing the linked search list in the random access memory. Other embodiments, aspects and features are also disclosed herein.

22 Claims, 9 Drawing Sheets

|  | 104 | 102 | 103 |
|---|---|---|---|
| Head Pointer 105 | Previous 104-1 | Interrupt status vector 102-1 | Next 103-1 |
|  | Previous 104-2 | Interrupt status vector 102-2 | Next 103-2 |
|  | Previous 104-3 | Interrupt status vector 102-3 | Next 103-3 |
| Scan pointer 107 | Previous 104-4 | Interrupt status vector 102-4 | Next 103-4 |
|  | Previous 104-5 | Interrupt status vector 102-5 | Next 103-5 |
|  | ... | ... | ... |
| Tail Pointer 106 | Previous 104-N | Interrupt status vector 102-N | Next 103-N |

METHODS AND APPARATUS FOR RAPID INTERRUPT LOOKUPS

BACKGROUND

Technical Field

The present invention relates generally to integrated circuits, data processing and data communications.

Description of the Background Art

Interrupt status bits are conventionally stored in registers. A summary tree of combinational logic is generally used to rapidly look-up a fired interrupt from the registers.

SUMMARY

The present disclosure provides methods and apparatus for rapid interrupt look-ups for interrupts stored in memory.

One embodiment relates to a method for providing interrupt lookups for a plurality of interrupt status vectors stored in random access memory on an integrated circuit. The plurality of interrupt status vectors in the random access memory are scanned to find activated interrupt status vectors that changed from null to non-null and dismissed interrupt status vectors that changed from non-null to null. A linked search list is maintained in the random access memory by inserting memory addresses of the activated interrupt status vectors into the linked search list and removing memory addresses of the dismissed interrupt status vectors from the linked search list. Interrupt status vectors for currently active interrupts are looked-up by traversing the linked search list in the random access memory.

Another embodiment relates to an integrated circuit that includes random access memory, a plurality of interrupt status vectors stored in the random access memory, and logic for performing interrupt lookups for the plurality of interrupt status vectors. Among other operations, the logic determines a next memory address pointed to by a next address pointer associated with a current memory address in a linked search list and scans the next memory address to determine a next interrupt status vector associated with the next memory address.

Another embodiment relates to a method of providing interrupt lookups for a plurality of interrupt status vectors stored in memory on an integrated circuit. The method involves determining a next memory address pointed to by a next address pointer associated with a current memory address in a linked search list. That next memory address is scanned to determine a next interrupt status vector associated with the next memory address.

Other embodiments, aspects and features are also disclosed herein.

DETAILED DESCRIPTION

The present disclosure provides methods and apparatus for rapid interrupt lookups. The methods and apparatus may be applied advantageously when a large number of interrupt status vectors are stored in random access memory (RAM).

When a large number of interrupt status vectors are stored in RAM, a straightforward solution is to scan every address in the RAM that stores an interrupt status vector. However, even if such a scan is performed in hardware for speed, the time that is taken to perform the scan scales in proportion to the number of interrupts. In other words, such a scan is an O(n) operation, where n is the number of interrupts. When the number of interrupts is very large (such as, for example, over ten thousand), then the scan may likely take an unacceptably long time to perform the lookup.

The present disclosure provides methods and apparatus for rapidly performing interrupt lookups for interrupts stored in memory.

Figure 1A:
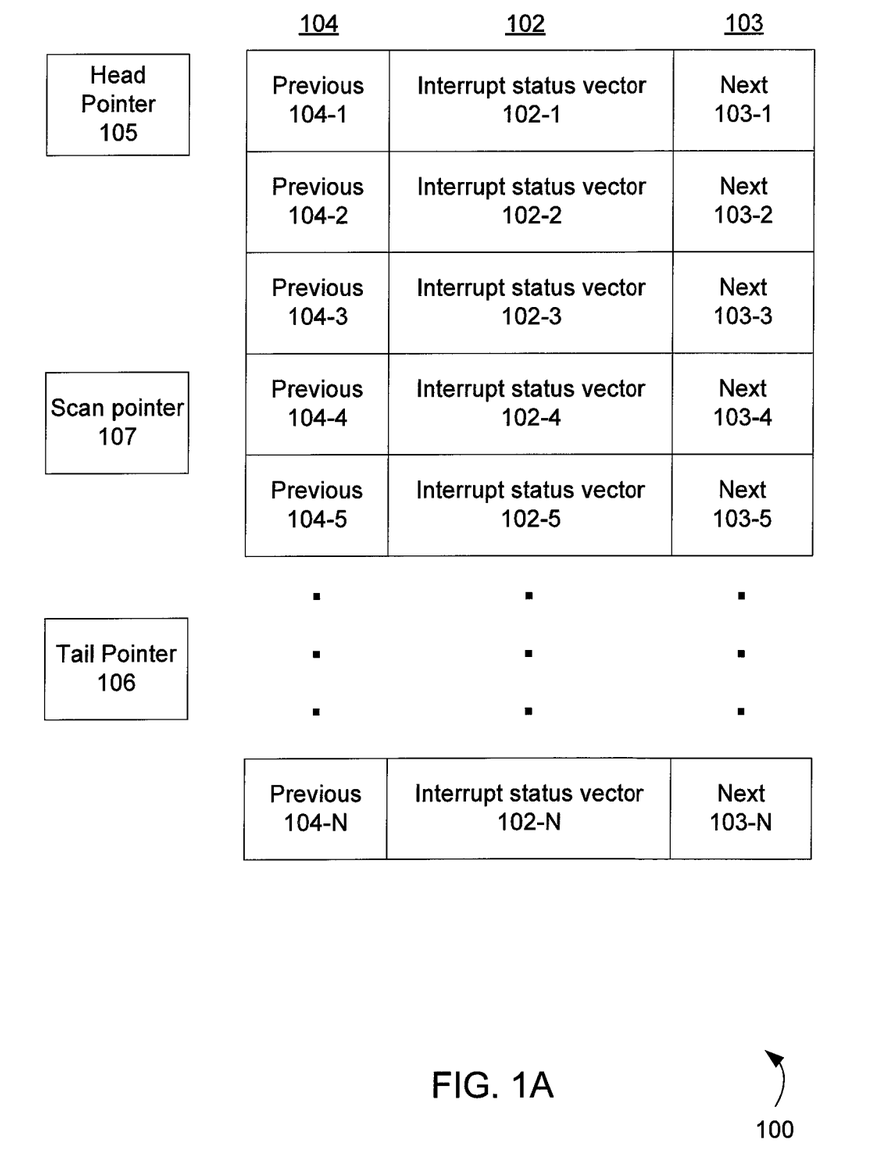
FIG. 1A depicts an exemplary data structure including multiple interrupt status vectors stored in memory and associated pointers stored in memory in accordance with an embodiment of the invention.

FIG. 1A depicts an exemplary data structure 100 including multiple interrupt status vectors stored in memory and associated pointers stored in memory in accordance with an embodiment of the invention. As shown, the data structure 100 includes a number N of interrupt status vectors (102-1, 102-2, 102-3, 102-4, 102-5, . . . , 102-N) with associated previous address pointers and next address pointers (103-1, 103-2, 103-3, 103-4, 103-5, . . . , 103-N) and (104-1, 104-2, 104-3, 104-4, 104-5, . . . , 104-N). In addition, the exemplary data structure 100 includes a head pointer 105, a tail pointer 106, and a scan pointer 107.

Each interrupt status vector (ISV) may be one or more bytes long. The ISVs 102 may be stored together (at adjacent addresses) in random access memory (RAM).

Each next address pointer and each previous address pointer may store (point to) a memory address. The next address pointers 103 may be stored together (at adjacent addresses) in RAM, and the addresses of the next address pointers may be offset from the associated ISVs by a next pointer offset. Similarly, the previous address pointers 104 may be stored together (at adjacent addresses) in RAM, and the addresses of the previous address pointers may be offset from the associated ISVs by a previous pointer offset. As described below, the next and previous address pointers may be used to implement a doubly-linked search list for active ISVs.

Each of the head and tail pointers may also store (point to) a memory address. As described below, the head and tail pointers may be used to indicate the start and end of the doubly-linked search list.

The number N depends on the system. Of particular relevance to the presently-disclosed invention, N may be rather large. For example, N may be over one thousand, or over ten thousand, or over one hundred thousand.

In one particular system, a large number of lower-speed clients are multiplexed onto a higher-speed communication link, such as an optical transport network (OTN) link, for example. The multiplexing may be done in multiple stages (for example, several 1G OTN clients into a 10G OTN client multiplexed into a 100G OTN client, etc.). Each lower-speed client may have its own independent set of interrupt bits, as do each multiplexing stage. As a result, there are a very large number of interrupt status vectors to be monitored, such as over 45,000 interrupt status vectors (i.e. N>45,000) in one particular example.

In accordance with an embodiment of the invention, such a large number of N interrupt status vectors may be stored in one or more RAM blocks on an integrated circuit. The integrated circuit may be a programmable logic device, such as a field programmable gate array, or an application specific integrated circuit. The associated next and previous address pointers may also be stored in one or more RAM blocks on the integrated circuit.

Figure 1B:
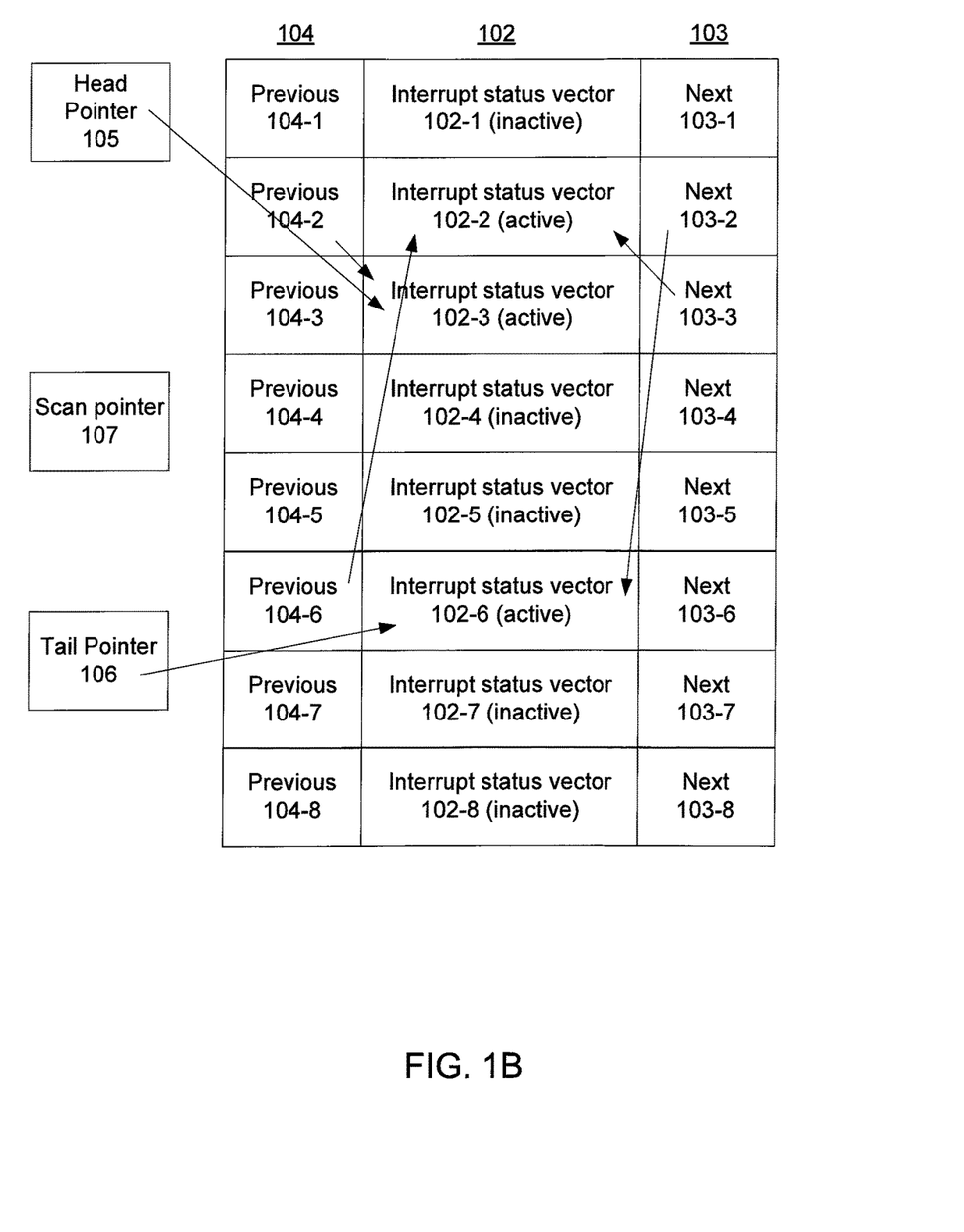
FIG. 1B depicts a small example of a doubly-linked search list for interrupts stored in memory in accordance with an embodiment of the invention.

FIG. 1B depicts a small example of a doubly-linked search list for interrupts stored in memory in accordance with an embodiment of the invention. In this small example, N=8. N would be much larger in a practical implementation of the presently-disclosed invention, but N is kept small in this example for ease of explanation and understanding.

Each interrupt status vector may be either inactive or active. In accordance with an embodiment of the invention, the inactive interrupt status vectors are in a null state where all bits are zero, while the active interrupt status vectors each have at least one bit that is non-zero (i.e. are in a non-null state). Advantageously, the null state for an inactive interrupt status vector may be rapidly determined with logic circuitry (e.g., a NOR logic gate), and the non-null state for an active interrupt status vector may also be rapidly determined with logic circuitry (e.g., an OR logic gate).

In the example depicted in FIG. 1B, interrupt status vectors 102-1, 102-4, 102-5, 102-7, and 102-8 are in an inactive (null) state, while interrupt status vectors 102-2, 102-3, and 102-6 are in an active (non-null) state. In this example, the head pointer 105 points to (i.e. contains) the memory address of ISV 102-3. This is because, in this example, ISV 102-3 is the first active ISV which is at the start position of the doubly-linked search list.

Further, in this example, the next address pointer 103-3, which is associated with ISV 102-3, points to (i.e. contains) the memory address of ISV 102-2. In other words, ISV 102-3 is the active ISV at the second position in the doubly-linked search list. In addition, the previous address pointer 104-2, which is associated with ISV 102-2, points to (i.e. contains) the memory address of ISV 102-3.

Further, in this example, the next address pointer 103-2, which is associated with ISV 102-2, points to the memory address of ISV 102-6. In other words, ISV 102-6 is the active ISV at the third position in the doubly-linked search list. In addition, the previous address pointer 104-6, which is associated with ISV 102-6, points to the memory address of ISV 102-2.

Finally, the tail pointer 106 points to (i.e. contains) the memory address of ISV 102-6. This is because ISV 102-6 is the last active ISV which is at the end position of the doubly-linked search list.

Figure 1C:
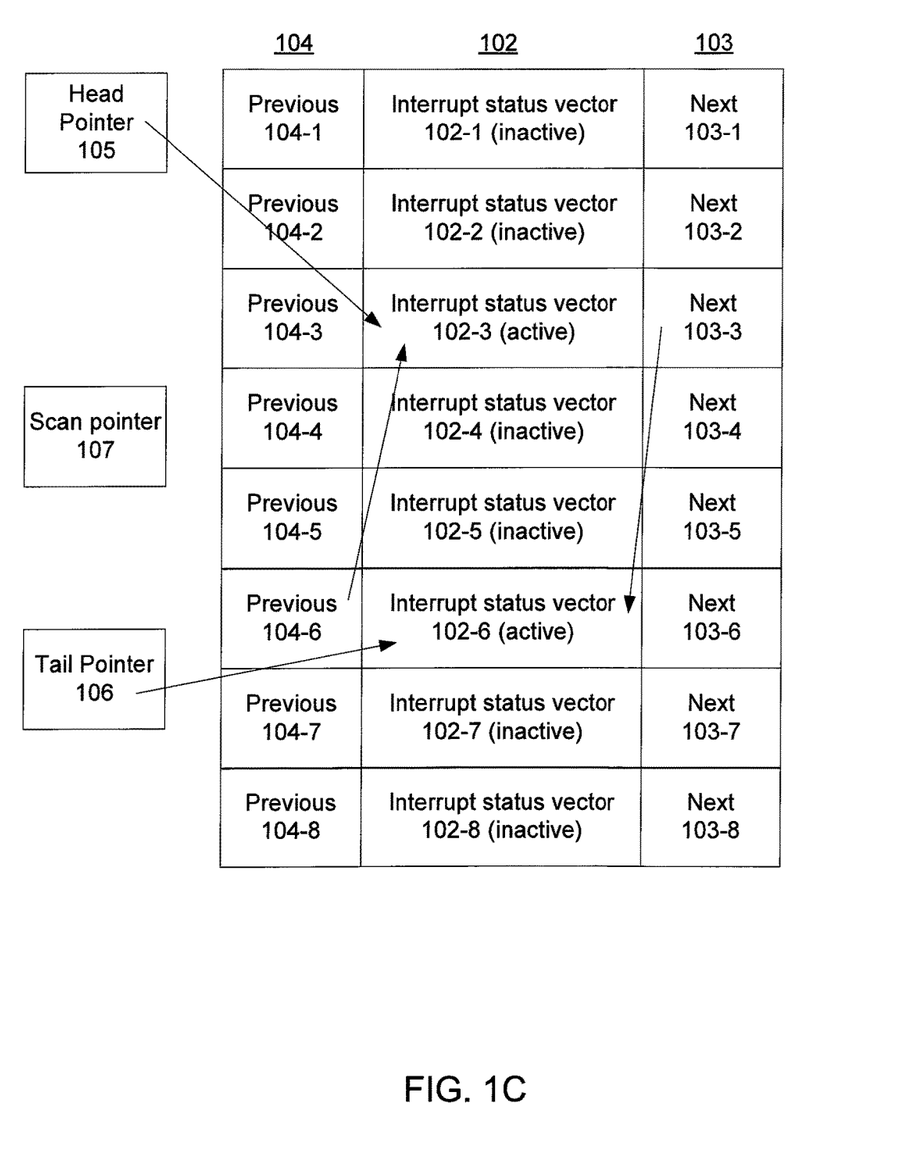
FIG. 1C shows the doubly-linked search list of FIG. 1B after removal of an interrupt status vector from the doubly-linked search list in accordance with an embodiment of the invention.

FIG. 1C shows the doubly-linked search list of FIG. 1B after removal of an interrupt status vector from the doubly-linked search list in accordance with an embodiment of the invention. In this example, ISV 102-2 has been removed from the doubly-linked search list.

In accordance with an embodiment of the invention, the procedure for removing ISV 102-2 from the doubly-linked search list of FIG. 1B so as to obtain the doubly-linked search list of FIG. 1C is as follows. In order to remove ISV 102-2, the previous address pointer 104-2 may be used to find the preceding memory address in the doubly-linked search list, and the next address pointer 103-2 may be used to find the subsequent memory address in the doubly-linked search list. In this case, as seen in FIG. 1B, the previous address pointer 104-2 points to the memory address of ISV 102-3 (the preceding memory address), and the next address pointer 103-2 points to the memory address of ISV 102-6 (the subsequent memory address). The subsequent memory address (the memory address of ISV 102-6) may then be written into the next address pointer 103-3 associated with the previous memory address, and the preceding memory address (the memory address of ISV 102-3) may then be written into the previous address pointer 104-6 associated with the subsequent memory address. After these steps are performed, the state of the doubly-linked search list is as shown in FIG. 1C.

Figure 1D:
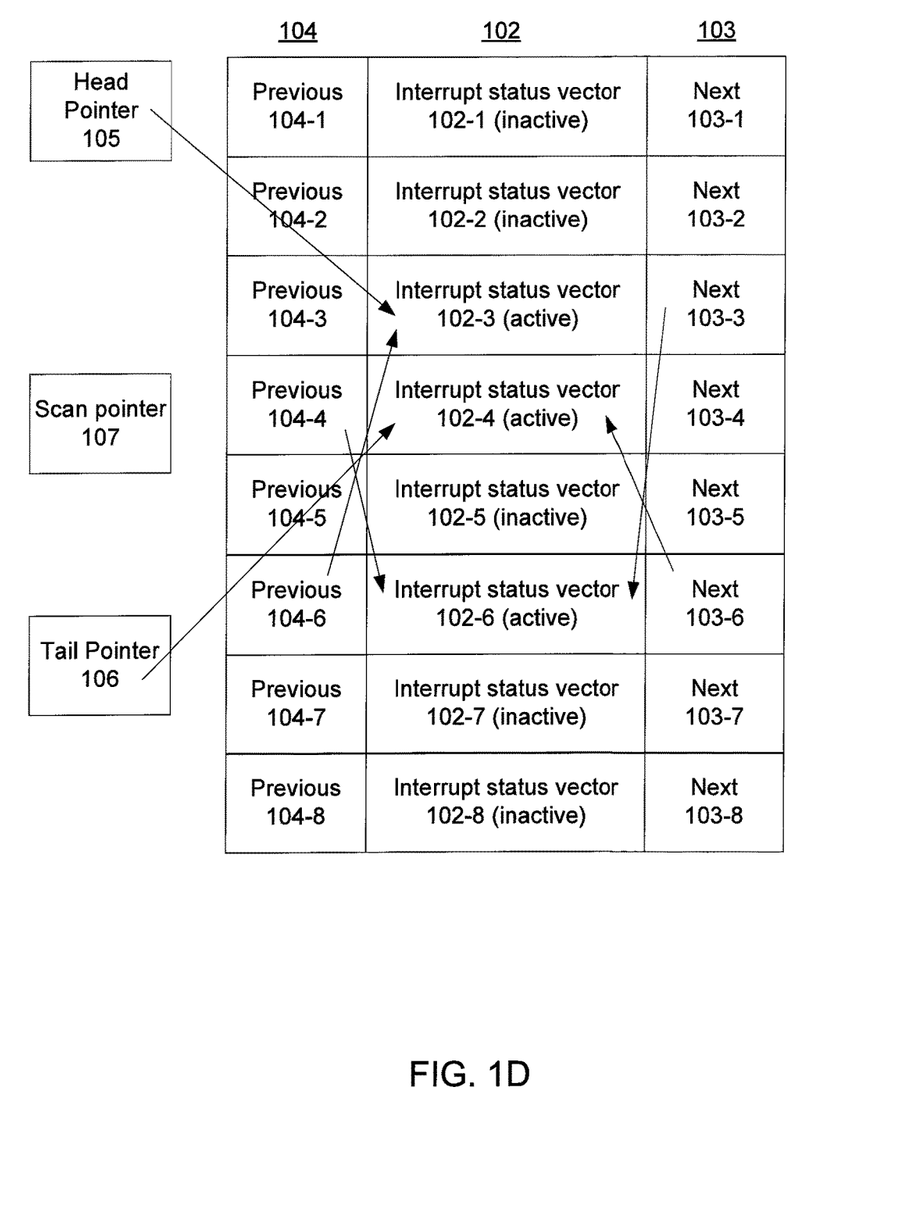
FIG. 1D shows the doubly-linked search list of FIG. 1C after addition of an interrupt status vector to the doubly-linked search list in accordance with an embodiment of the invention.

FIG. 1D shows the doubly-linked search list of FIG. 1C after addition of an interrupt status vector to the doubly-linked search list in accordance with an embodiment of the invention. In this example, ISV 102-4 has been added to the doubly-linked search list.

In accordance with an embodiment of the invention, the procedure for adding ISV 102-4 to the doubly-linked search list of FIG. 1C so as to obtain the doubly-linked search list of FIG. 1D is as follows. In order to add ISV 102-4, the tail pointer 106 may be used to find the last memory address in the doubly-linked search list. In this case, as seen in FIG. 1C, the tail pointer 106 points to the memory address of ISV 102-6 (the last memory address). The memory address of ISV 102-4 may then be written into a next address pointer associated with ISV 102-6, and the memory address of ISV 102-6 may then be written into the previous address pointer associated with ISV 102-4 (the interrupt status vector being inserted or added).

Figure 2:
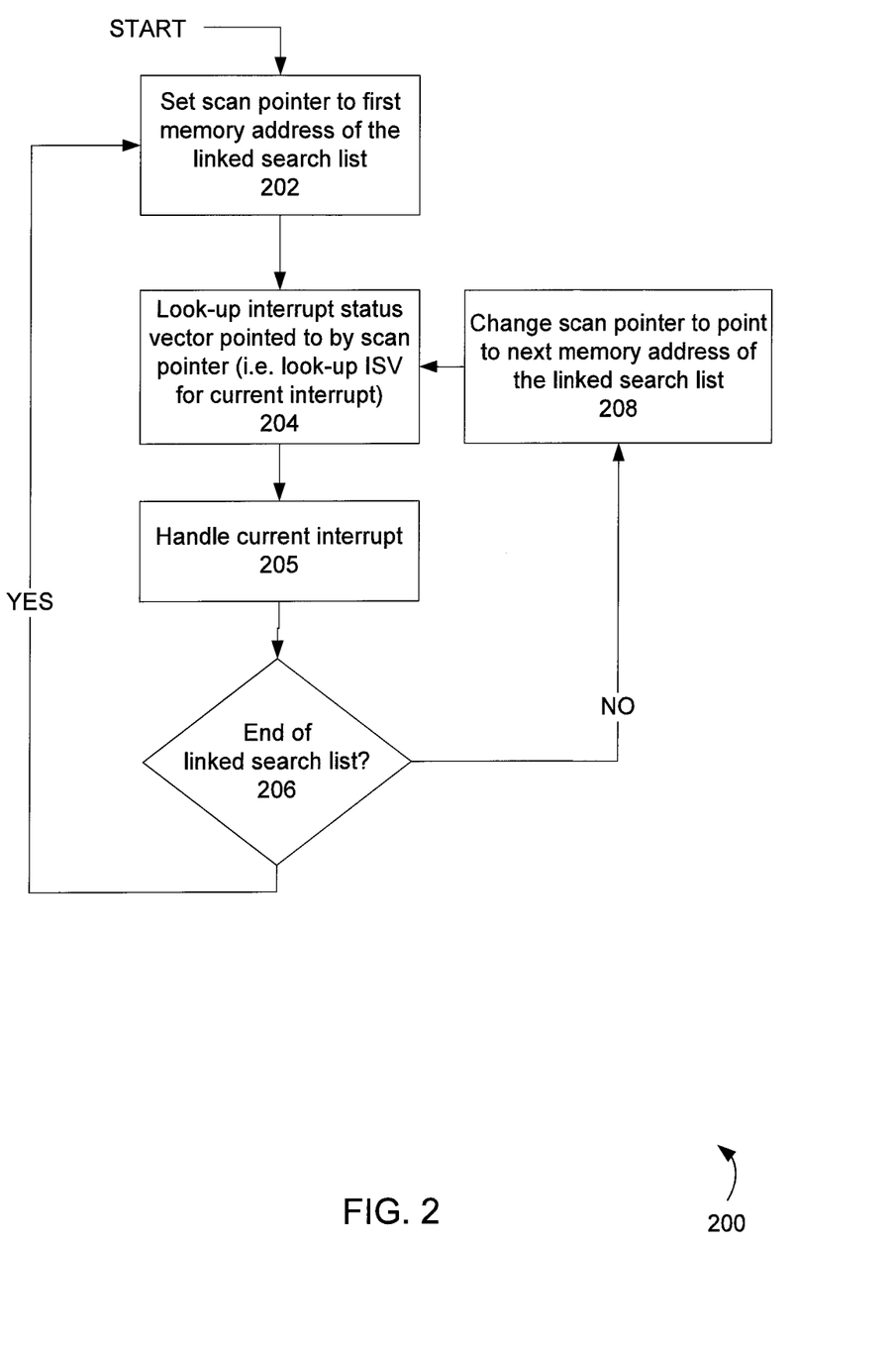
FIG. 2 is a flow chart of a method for rapid lookup and handling of multiple interrupts stored in memory by traversing a linked search list in accordance with an embodiment of the invention.

FIG. 2 is a flow chart of a method 200 for rapid lookup and handling of multiple active interrupts stored in memory by traversing a linked search list in accordance with an embodiment of the invention. The method 200 may be performed in an integrated circuit. The integrated circuit may be, for example, a programmable logic circuit, such as a field programmable gate array.

Per block 202, a scan pointer 107 may be set to be a first memory address of a linked search list. In accordance with an embodiment of the invention, the linked search list may be a doubly-linked search list, such as the example doubly-linked search list described above in relation to FIGS. 1A-1D. The first memory address may be obtained, for example, from a head pointer 105 for the linked search list.

Per block 204, the interrupt status vector stored at the memory address pointed to by the scan pointer 107 (i.e. the current interrupt) may be looked-up. The interrupt status vector may generally comprise a plurality of bits. In one embodiment, the interrupt status vector may indicate an appropriate interrupt handling routine for a datapath associated with the current interrupt. In one implementation, the memory address for the interrupt status vector corresponds to an identifier for the associated datapath.

Per block 205, the current interrupt (i.e. the interrupt that was just looked up) may be handled. For example, the interrupt handling routine pointed to by the interrupt status vector may be performed. After the current interrupt is handled, its interrupt status vector may be set to an inactive (for example, null) state.

Per block 206, after the current interrupt is handled, a determination may be made as to whether the current interrupt (i.e. the interrupt status vector that is pointed to by the scan pointer) was stored at the last memory address of the linked search list. In an exemplary implementation, this determination may be performed, for example, by checking whether the scan pointer 107 and a tail pointer 106 for the linked search list have the same value (i.e. point to the same interrupt).

If the current interrupt is not at the end of the linked search list, then, per block 208, the scan pointer 107 may be changed so that it points to a next memory address of the linked search list. In an exemplary implementation, the next memory address may be obtained, for example, from a next address pointer associated with the current interrupt.

On the other hand, if the current interrupt is at the end of the linked search list, then the method 200 starts over at the head of the linked search list by looping back to block 202.

The above-described method 200 advantageously uses the linked search list to more rapidly and efficiently look-up the active interrupts. For example, there may be tens of thousands of interrupts monitored by the integrated circuit, but only a small fraction (for example, a few hundred or less) of those interrupts may be currently active and so on the search list. Hence, the method 200 greatly decreases the time needed to perform all the necessary interrupt look-ups because it ignores (skips over) interrupts that are currently absent from the search list.

Figure 3:
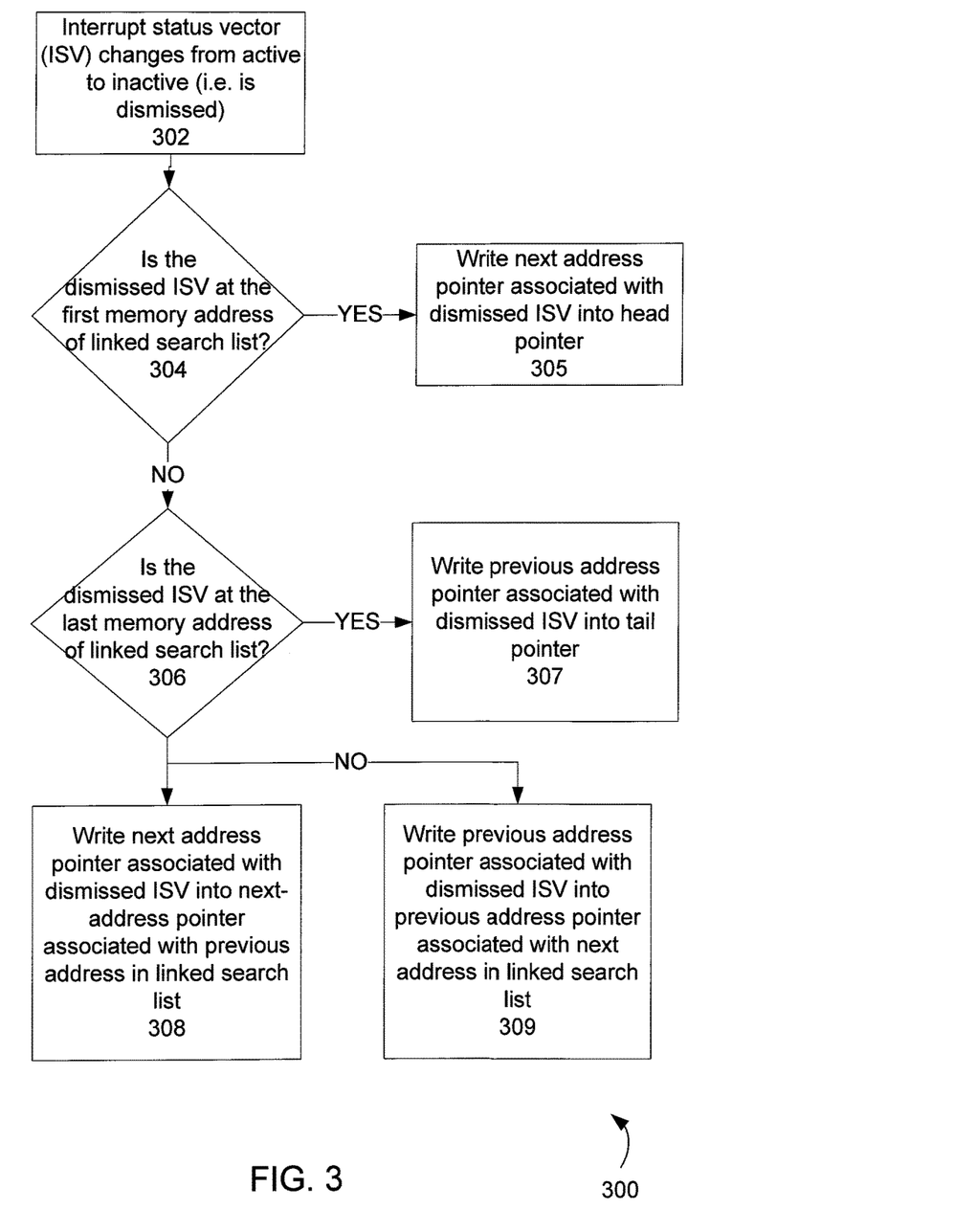
FIG. 3 is a flow chart of a method for removing an interrupt status vector from a doubly-linked search list in accordance with an embodiment of the invention.

FIG. 3 is a flow chart of a method 300 for removing an interrupt status vector from a doubly-linked search list in accordance with an embodiment of the invention. The method 300 may be performed in an integrated circuit. The integrated circuit may be, for example, a programmable logic circuit, such as a field programmable gate array.

Per block 302, an interrupt may be dismissed such that its interrupt status vector (ISV) may change from an active status to an inactive status. In accordance with an embodiment of the invention, the inactive status may be represented by an ISV that is null in that it has all zero (low) bits, while the active status may be represented by an ISV that has at least one bit that is one (high). If an interrupt has been dismissed (changed from active to inactive), then the following steps may be used to remove the dismissed ISV from the linked search list.

Per block 304, a determination may be made as to whether the dismissed ISV is at the first memory address (the head) of the linked search list. In accordance with an embodiment of the invention, this determination may be made by checking whether the head pointer for the linked search list points to the memory address of the dismissed ISV.

If the dismissed ISV is at the head of the linked search list, then, per block 305, the next address pointer associated with the dismissed ISV is written into the head pointer. In other words, the head pointer is changed so that it points to the next member of the linked list.

On the other hand, if the dismissed ISV is not at the head of the linked search list, then, per block 306, a determination may be made as to whether the dismissed ISV is at the last memory address (the tail) of the linked search list. In accordance with an embodiment of the invention, this determination may be made by checking whether the tail pointer for the linked search list points to the memory address of the dismissed ISV.

If the dismissed ISV is at the tail of the linked search list, then, per block 307, the previous address pointer associated with the dismissed ISV is written into the tail pointer. In other words, the tail pointer is changed so that it points to the previous member of the linked search list.

If the dismissed ISV is at neither the head or the tail of the linked search list, then both blocks 308 and 309 are performed. Per block 308, the next address pointer associated with the dismissed ISV is written into the next address pointer associated with the previous memory address in the linked search list. In other words, the next address pointer of the previous member of the linked list is changed to point to the member that followed the removed member in the linked list. Per block 309, the previous address pointer associated with the dismissed ISV is written into the previous address pointer associated with the next memory address in the linked search list. In other words, the previous address pointer of the next member of the linked list is changed to point to the member that preceded the removed member in the linked list.

Figure 4:
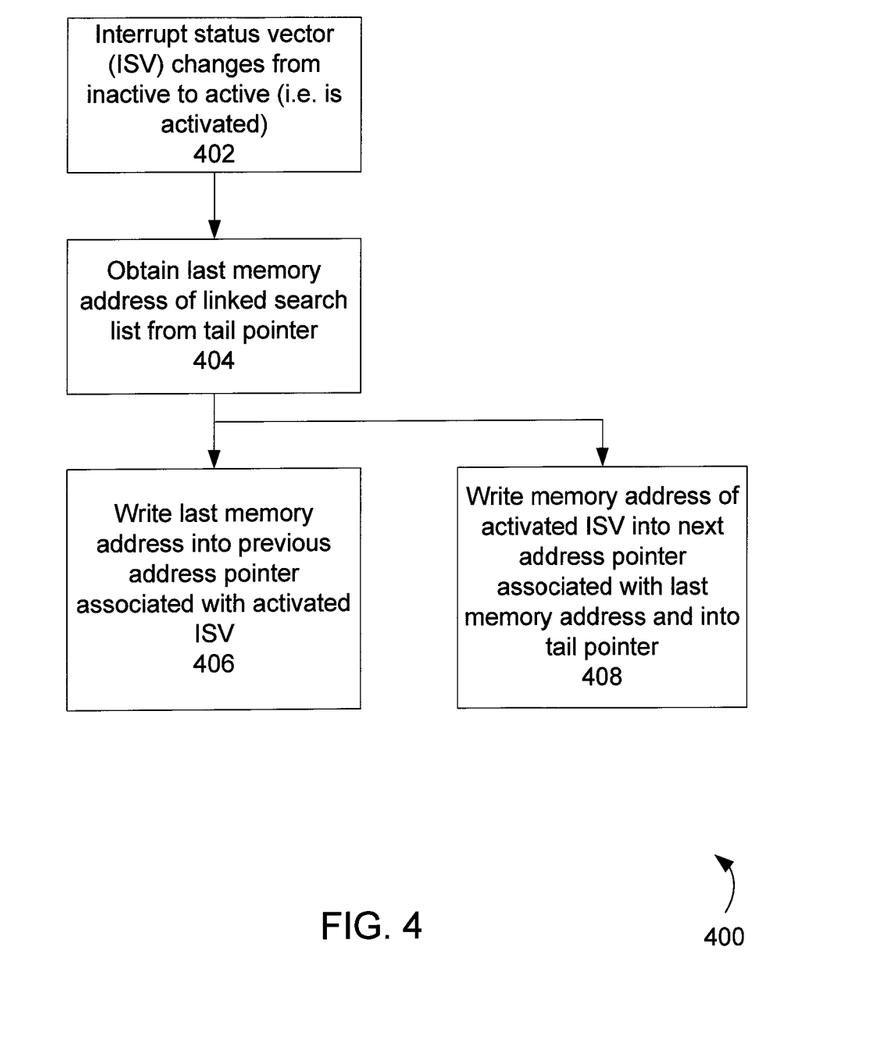
FIG. 4 is a flow chart of a method for adding an interrupt status vector from a doubly-linked search list in accordance with an embodiment of the invention.

FIG. 4 is a flow chart of a method 400 for adding an interrupt status vector from a doubly-linked search list in accordance with an embodiment of the invention. The method 400 may be performed in an integrated circuit. The integrated circuit may be, for example, a programmable logic circuit, such as a field programmable gate array.

Per block 402, an interrupt may be activated such that its interrupt status vector (ISV) may change from an inactive status to an active status. In accordance with an embodiment of the invention, the inactive status may be represented by an ISV that is null in that it has all zero (low) bits, while the active status may be represented by an ISV that has at least one bit that is one (high). If an interrupt has been activated (changed from inactive to active), then the following steps may be used to add the activated ISV to the linked search list.

Per block 404, a last memory address of the linked search list is obtained. In accordance with an embodiment of the invention, the last memory address may be obtained from the tail pointer for the linked search list.

Per block 406, the last memory address is written into the previous address pointer associated with the activated ISV. In addition, per block 408, the memory address of the activated ISV may then be written into the next address pointer associated with the last memory address and into the tail pointer.

Exemplary FPGA and System

Figure 5:
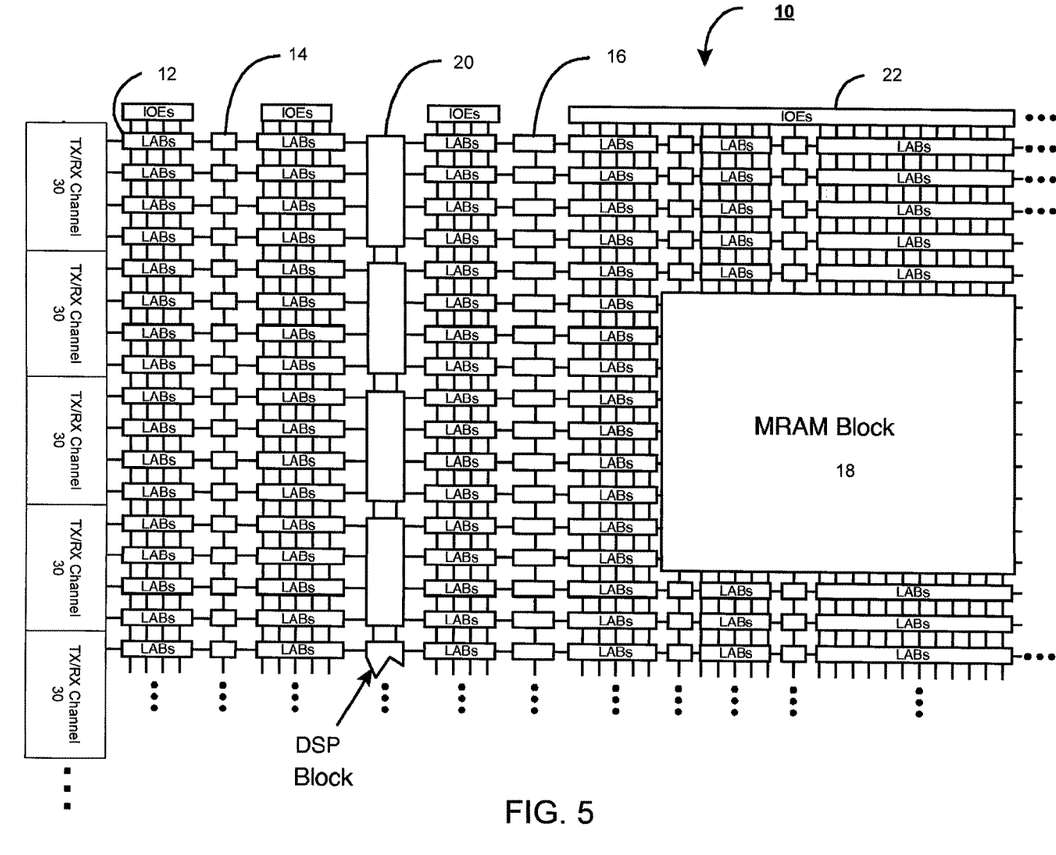
FIG. 5 is a simplified partial block diagram of an exemplary field programmable gate array (FPGA) that may be configured to employ structures and use techniques disclosed herein.

FIG. 5 is a simplified partial block diagram of an exemplary field programmable gate array (FPGA) 10 that may be configured to employ structures and use techniques disclosed herein. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs).

FPGA 10 includes within its "core" a two-dimensional array of programmable logic array blocks (or LABs) 12 that are interconnected by a network of column and row interconnect conductors of varying length and speed. LABs 12 include multiple (e.g., ten) logic elements (or LEs). A LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 10 may also include a distributed memory structure including random access memory (RAM) blocks of varying sizes provided throughout the array. The RAM blocks include, for example, blocks 14, blocks 16, and block 18. These memory blocks can also include shift registers and FIFO buffers.

FPGA 10 may further include digital signal processing (DSP) blocks 20 that can implement, for example, multipliers with add or subtract features. Input/output elements (IOEs) 22 located, in this example, around the periphery of the chip support numerous single-ended and differential input/output standards. Each IOE 22 is coupled to an external terminal (i.e., a pin) of FPGA 10. A transceiver (TX/RX) channel array may be arranged as shown, for example, with each TX/RX channel circuit 30 being coupled to several LABs.

It is to be understood that FPGA 10 is described herein for illustrative purposes only and that the present invention can be implemented in many different types of PLDs, FPGAs, and ASICs.

Figure 6:
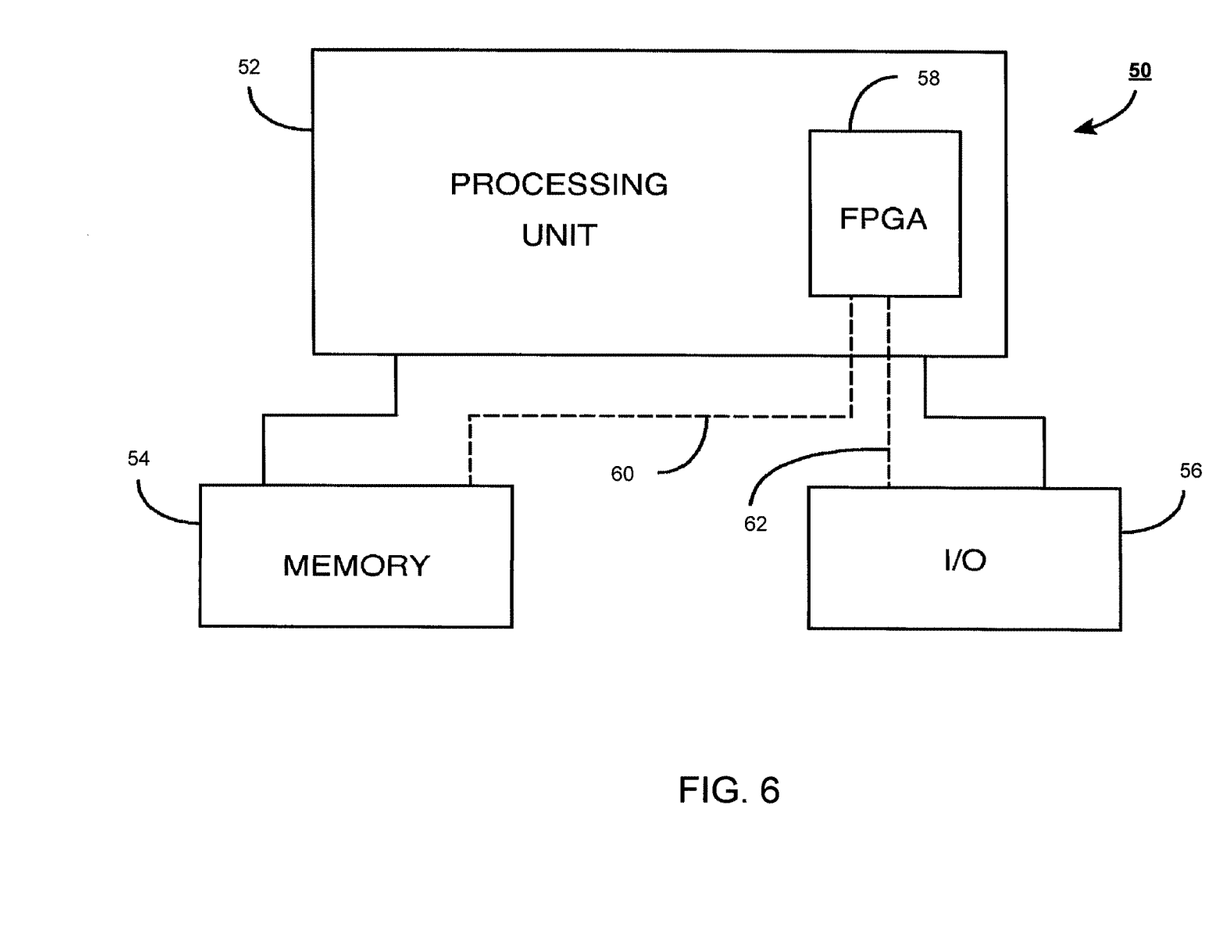
FIG. 6 shows a block diagram of an exemplary digital system that may include an FPGA.

FIG. 6 shows a block diagram of an exemplary digital system 50 that may include an FPGA. System 50 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 50 may be provided on a single board, on multiple boards, or within multiple enclosures.

System 50 includes a processing unit 52, a memory unit 54, and an input/output (I/O) unit 56 interconnected together by one or more buses. According to this exemplary embodiment, FPGA 58 is embedded in processing unit 52. FPGA 58 can serve many different purposes within the system 50. FPGA 58 can, for example, be a logical building block of processing unit 52, supporting its internal and external operations. FPGA 58 is programmed to implement the logical functions necessary to carry on its particular role in system operation. FPGA 58 can be specially coupled to memory 54 through connection 60 and to I/O unit 56 through connection 62.

Processing unit 52 may direct data to an appropriate system component for processing or storage, execute a program stored in memory 54, receive and transmit data via I/O unit 56, or other similar function. Processing unit 52 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 58 may control the logical operations of the system. As another example, FPGA 58 acts as a reconfigurable processor that may be reprogrammed as needed to handle a particular computing task. Alternately, FPGA 58 may itself include an embedded microprocessor. Memory unit 54 may be a random access memory (RAM), read only memory (ROM), fixed or flexible disk media, flash memory, tape, or any other storage means, or any combination of these storage means.

CONCLUSION

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A method for providing interrupt lookups for a plurality of interrupt status vectors stored in memory on an integrated circuit, the method comprising:
   determining a next memory address pointed to by a next address pointer associated with a current memory address in a linked search list;
   scanning the next memory address to determine a next interrupt status vector associated with the next memory address; and
   maintaining the linked search list by removing a memory address of an interrupt status vector from the linked search list when the interrupt status vector at the memory address changes from having one or more bits that are one to a null status.

2. The method of claim 1, further comprising:
   if the next memory address is not a last memory address of the linked search list, then repeating said determining and said scanning.

3. The method of claim 2, wherein the last memory address is pointed to by a tail pointer of the linked search list.

4. The method of claim 2, further comprising:
   returning from the method when the next memory address is the last address pointed to by the tail pointer.

5. The method of claim 1, further comprising, at a start of the method:
   determining a first memory address pointed to by a head pointer of the search list;
   scanning the first memory address to determine a first interrupt status vector associated with the first memory address; and
   performing an interrupt handling routine indicated by the first interrupt status vector.

6. The method of claim 5, wherein the first memory address is pointed to by a head pointer of the linked search list.

7. The method of claim 1, wherein each memory address in the linked search list contains an interrupt status vector that is triggered.

8. The method of claim 1, wherein the memory address of the interrupt status vector is removed from the linked search list by:

finding a preceding memory address in the linked search list using a previous address pointer associated with the memory address;

finding a subsequent memory address in the linked search list using a next address pointer associated with the memory address;

writing the subsequent memory address into a next address pointer associated with the preceding memory address; and writing the preceding memory address into a previous address pointer associated with the subsequent memory address.

9. A method for providing interrupt lookups for a plurality of interrupt status vectors stored in memory on an integrated circuit, the method comprising:

determining a next memory address pointed to by a next address pointer associated with a current memory address in a linked search list;

scanning the next memory address to determine a next interrupt status vector associated with the next memory address; and maintaining the linked search list by inserting a memory address of an interrupt status vector into the linked search list when the interrupt status vector at the memory address is changed from a null status to having one or more bits that are one.

10. The method of claim 9, wherein the memory address of the interrupt status vector is inserted into the linked search list by:

finding a last memory address in the linked list using a tail pointer of the linked search list;

writing the memory address into a next address pointer associated with the last memory address and into the tail pointer; and writing the last memory address into a previous address pointer associated with the memory address.

11. The method of claim 1, wherein the memory comprises random access memory.

12. The method of claim 1, wherein the method is performed by a programmable logic device, and the memory in which the plurality of interrupt status vectors are stored comprises a memory block in the programmable logic device.

13. The method of claim 1, wherein the method is performed by an application specific integrated circuit, and the memory in which the plurality of interrupt status vectors are stored comprises a memory block in the application specific integrated circuit.

14. The method of claim 1, wherein the plurality of interrupt status vectors are associated a plurality of clients sharing a context-sensitive datapath using time-division multiple access.

15. An integrated circuit comprising:

random access memory;

a plurality of interrupt status vectors stored in the random access memory;

logic for performing interrupt lookups for the plurality of interrupt status vectors, wherein said logic determines a next memory address pointed to by a next address pointer associated with a current memory address in a linked search list, and scans the next memory address to determine a next interrupt status vector associated with the next memory address, wherein said logic maintains the linked search list by removing a memory address of an interrupt status vector from the linked search list when the interrupt status vector at the memory address changes from having one or more bits that are one to a null status.

16. The integrated circuit of claim 15, wherein said logic removes the memory address of the interrupt status vector from the linked search list by finding a preceding memory address in the linked search list using a previous address pointer associated with the memory address, finding a subsequent memory address in the linked search list using a next address pointer associated with the memory address, writing the subsequent memory address into a next address pointer associated with the preceding memory address, and writing the preceding memory address into a previous address pointer associated with the subsequent memory address.

17. An integrated circuit comprising:

random access memory;

a plurality of interrupt status vectors stored in the random access memory;

logic for performing interrupt lookups for the plurality of interrupt status vectors, wherein said logic determines a next memory address pointed to by a next address pointer associated with a current memory address in a linked search list, and scans the next memory address to determine a next interrupt status vector associated with the next memory address, wherein said logic maintains the linked search list by inserting a memory address of an interrupt status vector into the linked search list when the interrupt status vector at the memory address changes from a null status to having one or more bits that are one.

18. The integrated circuit of claim 17, wherein said logic inserts the memory address of the interrupt status vector into the linked search list by finding a last memory address in the linked list using a tail pointer of the linked search list, writing the memory address into a next address pointer associated with the last memory address and into the tail pointer, and writing the last memory address into a previous address pointer associated with the memory address.

19. The integrated circuit of claim 17, wherein the plurality of interrupt status vectors are associated a plurality of clients sharing a context-sensitive datapath using time-division multiple access.

20. A method for providing interrupt lookups for a plurality of interrupt status vectors stored in random access memory on an integrated circuit, the method comprising:

scanning the plurality of interrupt status vectors in the random access memory to find activated interrupt status vectors that changed from null to non-null and dismissed interrupt status vectors that changed from non-null to null; and maintaining a linked search list in the random access memory by inserting memory addresses of the activated interrupt status vectors into the linked search list and removing memory addresses of the dismissed interrupt status vectors from the linked search list; and looking up and handling interrupt status vectors for currently active interrupts by traversing the linked search list in the random access memory.

21. The method of claim 20, wherein the linked search list comprises a doubly-linked list that includes next address and previous address pointers.

22. The method of claim 20, wherein the plurality of interrupt status vectors are associated a plurality of clients sharing a context-sensitive datapath using time-division multiple access.

* * * * *